United States Patent
Yonezawa et al.

(10) Patent No.: US 10,547,063 B2
(45) Date of Patent: Jan. 28, 2020

(54) FUEL CELL AND METHOD OF MANUFACTURING SAME

(71) Applicant: HONDA MOTOR CO., LTD., Tokyo (JP)

(72) Inventors: Satoshi Yonezawa, Tochigi (JP); Hitoshi Nagasaki, Tochigi (JP); Takehiro Mugishima, Tochigi (JP); Kazuhide Matsuo, Tochigi (JP); Ayumi Mizuno, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 15/759,069

(22) PCT Filed: Aug. 24, 2016

(86) PCT No.: PCT/JP2016/074661
§ 371 (c)(1),
(2) Date: Mar. 9, 2018

(87) PCT Pub. No.: WO2017/047343
PCT Pub. Date: Mar. 23, 2017

(65) Prior Publication Data
US 2019/0051915 A1 Feb. 14, 2019

(30) Foreign Application Priority Data
Sep. 18, 2015 (JP) .................. 2015-185864

(51) Int. Cl.
*H01M 8/0247* (2016.01)
*H01M 8/2418* (2016.01)
(Continued)

(52) U.S. Cl.
CPC ......... *H01M 8/0247* (2013.01); *H01M 4/881* (2013.01); *H01M 8/0271* (2013.01); *H01M 8/1004* (2013.01); *H01M 8/2418* (2016.02)

(58) Field of Classification Search
None
See application file for complete search history.

(56) References Cited

FOREIGN PATENT DOCUMENTS

| | | |
|---|---|---|
| JP | 2004-146092 | 5/2004 |
| JP | 2008-047453 | 2/2008 |

(Continued)

OTHER PUBLICATIONS

International Search Report, dated Nov. 29, 2016 (Nov. 29, 2016), 1 page.

*Primary Examiner* — Wyatt P McConnell
(74) *Attorney, Agent, or Firm* — Rankin, Hill & Clark LLP

(57) ABSTRACT

Provided is a fuel cell capable of easily forming an interconnector part electrically connecting adjacent unit cells in a planar array fuel cell. In the fuel cell, an electrode layer on each of two surfaces of an electrolyte membrane is divided into a plurality of electrode regions by a dividing groove; a unit cell is constituted by a stacked structure including the electrolyte membrane, one electrode region on one surface of the electrolyte membrane, and one electrode region on the other surface thereof; and the plurality of the unit cells are connected in series by the interconnector part formed in the electrolyte membrane. The interconnector part is formed by heating and carbonizing a proton conductive resin in the electrolyte membrane. The proton conductive resin can be heated by laser beam irradiation.

6 Claims, 8 Drawing Sheets

(51) Int. Cl.
*H01M 4/88* (2006.01)
*H01M 8/0271* (2016.01)
*H01M 8/1004* (2016.01)

(56) References Cited

FOREIGN PATENT DOCUMENTS

| | | |
|---|---|---|
| JP | 2011-204609 | 10/2011 |
| JP | 2013-115036 | 6/2013 |

FUEL CELL AND METHOD OF MANUFACTURING SAME

TECHNICAL FIELD

The present invention relates to a planar array fuel cell in which unit cells are arranged in a plane, and a method of manufacturing the same.

BACKGROUND ART

A fuel cell is a device that obtains electric power from hydrogen and oxygen. The fuel cell has recently attracted attention as a clean power source since the power generation produces only water. Such a fuel cell includes a unit cell having a low voltage ranging from 0.6 to 0.8 V. Thus, a currently available fuel cell stack is fabricated by stacking and serially connecting a plurality of unit cells composed of membrane electrode assemblies (MEAs) and separators to obtain high output. This fuel cell stack, however, has a problem that the stacking involves a lot of work steps and thus takes time and effort.

Meanwhile, there is known a fuel cell fabricated by forming a plurality of unit cells in a plane on a sheet of electrolyte membrane, forming an interconnector part for connecting adjacent unit cells, and connecting the plurality of unit cells in series (for example, see Patent Literature 1). Such a configuration has advantages capable of increasing the voltage with one sheet of electrolyte membrane and eliminating or reducing the work of stacking the unit cells.

CITATION LIST

Patent Literature

Patent Literature 1: Japanese Patent Laid-Open No. 011-204609

SUMMARY OF INVENTION

Technical Problem

In such a fuel cell disclosed in Patent Literature 1, a void portion is formed in a part of the electrolyte membrane, and the interconnector part is formed by filling the void portion with an anode catalyst layer material or a cathode catalyst layer material. However, such a configuration has a problem that the formation of the interconnector part requires several steps that take time and effort.

In view of the above conventional problem, the present invention has been made, and an object of the present invention is to provide a fuel cell capable of easily forming an interconnector part electrically connecting adjacent unit cells in a planar array fuel cell and a method of manufacturing the same.

Solution to Problem

In order to solve the above problem, a fuel cell of the present invention comprises an electrode layer on each of two surfaces of an electrolyte membrane made of a proton conductive resin, wherein the electrode layers on the two surfaces each include a plurality of electrode regions divided by a dividing groove; and a unit cell is constituted by a stacked structure including one electrode region on one surface side of the two surfaces, one electrode region on the other surface side opposing the one electrode region on the one surface side, and the electrolyte membrane; and the unit cell comprises a plurality of unit cells constituting the fuel cell, wherein the electrolyte membrane includes therein an interconnector part electrically connecting the electrode region on the one surface side of one of the unit cells and the electrode region on the other surface side of a unit cell arranged adjacent to the one unit cell; and the interconnector part is made of conductive carbide derived from proton conductive resin of the electrolyte membrane.

In the fuel cell of the present invention, the interconnector part electrically connecting the adjacent unit cells is made of conductive carbide derived from the proton conductive resin of the electrolyte membrane, and thereby can be easily formed without requiring complicated steps. The reason for this is that the conductive carbide, that is, the interconnector part can be obtained only by carbonizing a part of the electrolyte membrane.

The fuel cell of the present invention preferably further comprises a pressing member pressing each of the electrode layers on the two surfaces against the interconnector part. There may be insufficient contact between the interconnector part located between the electrode layers on the two surfaces and the electrode layers, which may cause a conductive failure, but providing the pressing member pressing against at least the interconnector part can ensure the contact between the interconnector part and the electrode layers, and thereby can ensure the continuity of the electrode layers on the two surfaces.

Meanwhile, a method of manufacturing a fuel cell of the present invention is a method of manufacturing a fuel cell comprising an electrode layer on each of two surfaces of an electrolyte membrane made of a proton conductive resin, wherein the electrode layers on the two surfaces each include a plurality of electrode regions divided by a dividing groove; a unit cell is constituted by a stacked structure including one electrode region on one surface side of the two surfaces, one electrode region on the other surface side opposing the one electrode region on the one surface side, and the electrolyte membrane; a plurality of the unit cells being arranged; the electrolyte membrane includes therein an interconnector part electrically connecting the electrode region on the one surface side of one of the unit cells and the electrode region on the other surface side of a unit cell arranged adjacent to the one unit cell; and the interconnector part is made of conductive carbide derived from proton conductive resin of the electrolyte membrane, wherein the interconnector part is formed by applying heat locally to the electrolyte membrane and carbonizing the proton conductive resin.

In the method of manufacturing the fuel cell of the present invention, the interconnector part can be formed only by applying heat locally to the electrolyte membrane and carbonizing the proton conductive resin to form a conductive carbide, and thereby can be easily formed without requiring complicated steps.

It is preferable to apply heat to the electrolyte membrane by irradiating the electrolyte membrane with laser light, which is most convenient.

The proton conductive resin is preferably an aromatic polymer compound obtained by introducing sulfonic acid groups into hydrocarbon polymers such as aromatic polyarylene ether ketones and aromatic polyarylene ether sulfones. Such a compound is easily changed to a conductive carbide by heating.

Advantageous Effects of Invention

The present invention can provide a fuel cell capable of easily forming an interconnector part electrically connecting adjacent unit cells in a planar array fuel cell, and a method of manufacturing the same.

DESCRIPTION OF EMBODIMENTS

Hereinafter, an embodiment of the present invention will be described further in detail with reference to the accompanying drawings.

<Fuel Cell>

Figure 1:
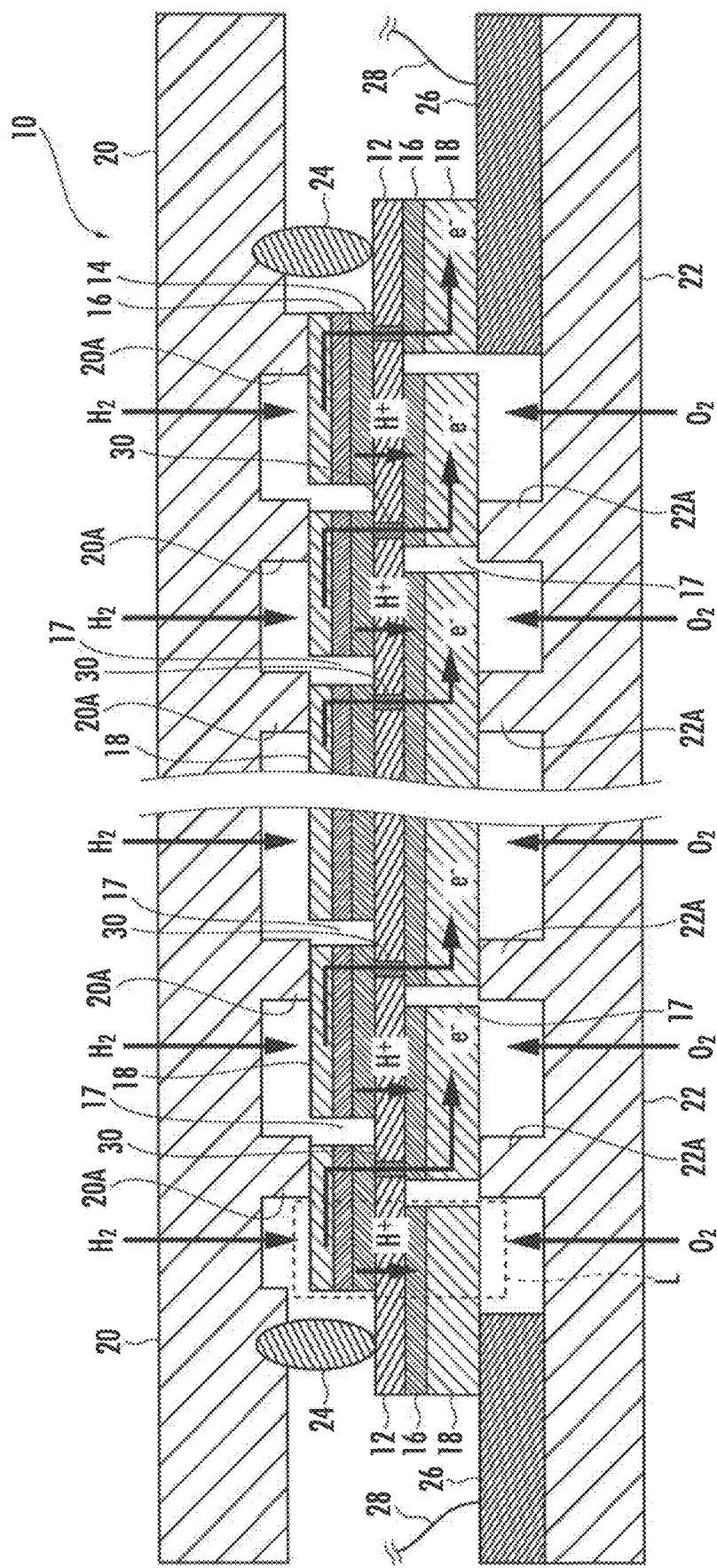
FIG. 1 is a schematic sectional view illustrating a fuel cell to which the present invention is applied.
Figure 2:
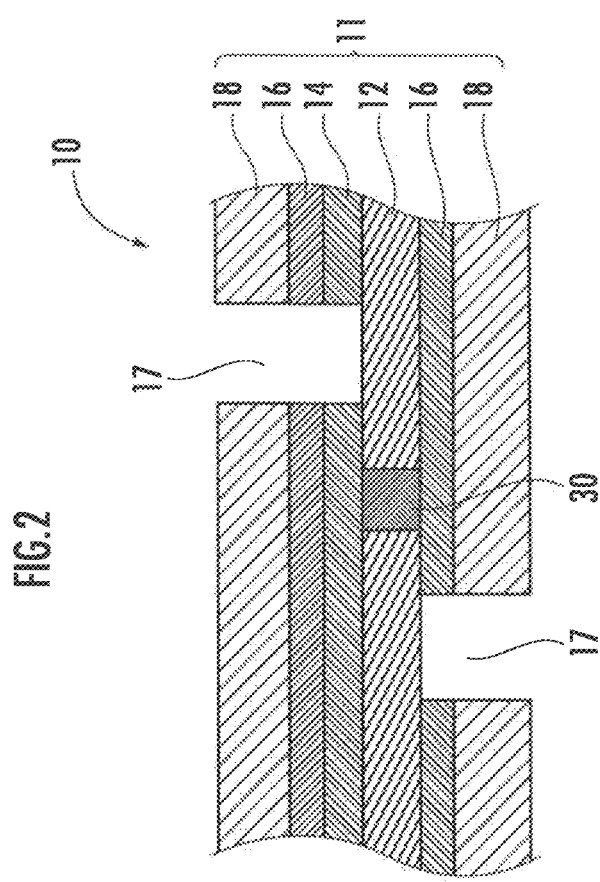
FIG. 2 is an enlarged sectional view illustrating an essential part of the fuel cell illustrated in FIG. 1.

FIG. 1 is a schematic sectional view illustrating an embodiment of a fuel cell to which the present invention is applied; and FIG. 2 is an enlarged sectional view illustrating an essential part of the fuel cell illustrated in FIG. 1, wherein the upper side illustrates an anode and the lower side illustrates a cathode. FIGS. 1 and 2 illustrate a membrane electrode assembly (MEA) 11 of a fuel cell 10, wherein each side of the two surfaces of an electrolyte membrane 12 includes a gas diffusion layer 18, the lower side includes a catalyst layer 16 as an electrode layer, and the upper side includes a catalyst layer 16 as an electrode layer and a protection layer 14 contacting the electrolyte membrane 12. In other words, in the present embodiment, the electrode layer on the upper side includes two layers: the catalyst layer 16 and the protection layer 14. Further, an upper plate 20 is disposed above the gas diffusion layer 18 on the upper side, and a lower plate 22 is disposed under the gas diffusion layer on the lower side. The upper plate 20 and the lower plate 22 serve as pressing members pressing the MEA 11 with a predetermined force. Note that FIG. 1 omits the stacked structure located in the center.

The surface of the gas diffusion layer 18 on each side of the upper plate 20 and the lower plate 22 includes flow channel grooves (recessed portions in the figure) for hydrogen gas and oxygen-containing gas (air). A seal 24 is disposed between the upper plate 20 and a peripheral portion on the upper surface (anode side) of the electrolyte membrane 12. The seal 24 contacts the electrolyte membrane 12 and the upper plate 20 to seal the space between the upper plate 20 and the electrolyte membrane 12. Note that the upper plate 20 includes an unillustrated hydrogen inlet for introducing hydrogen supplied from an unillustrated hydrogen supply means into between the upper plate 20 and the electrolyte membrane 12. Meanwhile, the lower surface (cathode side) of the electrolyte membrane 12 is structured to take in oxygen from surrounding air without being sealed unlike the upper surface.

In addition, on the lower surface (cathode side) of the electrolyte membrane 12, a graphite sheet 26 is disposed between the lower plate 22 and the gas diffusion layer 18 on the lower surface of the two end portions (left end and right end in FIG. 1) of the MEA 11, and the graphite sheet 26 is configured to contact the gas diffusion layer 18. A conducting wire 28 is connected to each graphite sheet 26, and power generated by the fuel cell 10 is extracted outside through the conducting wire 28. Note that the electrolyte membrane 12, the catalyst layer 16, and the gas diffusion layer 18 on the lower surface side thereof are sandwiched by the upper plate 20 and the lower plate 22 in a state of being pressed with a certain pressure.

The protection layer 14, the catalyst layer 16, and the gas diffusion layer 18 on the upper surface side of the electrolyte membrane 12 as well as the catalyst layer 16 and the gas diffusion layer 18 on the lower surface side of the electrolyte membrane 12 are divided into a plurality of regions (hereinafter referred to as "electrode regions") by a plurality of dividing grooves 17. Each electrode region has a rectangular shape having a long side in the extending direction of the dividing groove 17 and a short side between the two dividing grooves. In addition, the electrode regions on the upper surface side of the electrolyte membrane 12 are arranged facing the electrode regions on the lower surface side thereof.

In the MEA 11, a unit cell (power generation cell) is constituted by a stacked structure including one electrode region on the upper surface side of the electrolyte membrane 12, another electrode region on the lower surface side facing a part of the electrode region, and the electrolyte membrane 12 located between the two electrode regions. More specifically, in FIG. 1, the unit cell refers to a stacked structure including the electrolyte membrane 12, and the protection layer 14, the catalyst layer 16, and the gas diffusion layer 18 on the upper surface side thereof as well as the catalyst layer 16 and the gas diffusion layer 18 on the lower surface side thereof. In FIG. 1, only the leftmost unit cell is illustrated by a broken line L.

The electrolyte membrane 12 includes therein an interconnector part 30 electrically connecting an electrode region on the upper surface side of one unit cell and an electrode region on the lower surface side of a unit cell adjacent to the one unit cell. The interconnector part 30 electrically connects the adjacent unit cells in series.

In FIGS. 1 and 2, for example, the width (length between the two dividing grooves 17) of each electrode region can be about 5 mm, the width of the interconnector part 30 is about 0.1 mm, and the width of the dividing groove 17 is substantially 0.2 mm.

As described above, the electrolyte membrane 12, and the catalyst layer 16 and the gas diffusion layer 18 on the lower surface side thereof are sandwiched by the upper plate 20 and the lower plate 22 in a state of being pressed with a certain pressure. As illustrated in FIG. 1, the upper plate 20 and the lower plate 22 are disposed such that a protruding portion 20A of the upper plate 20 is positioned facing a protruding portion 22A of the lower plate 22 and is formed so as to sandwich the interconnector part 30. The protruding portions 20A and 22A press the electrode layers on the upper side and the lower side against the interconnector part 30 to further ensure the contact between the electrode layers and the interconnector part 30. Therefore, this configuration further ensures the continuity between the electrode layer on the upper side and the electrode layer on the lower side.

Here, from the viewpoint of applying a sufficient pressure to the interconnector part 30, the width of the protruding portions 20A and 22A is preferably equal to or greater than the width of the interconnector part 30 and equal to or less than the interval between the adjacent unit cells.

As described above, the upper plate 20 and the lower plate 22 are used to press the MEA 11. Other examples of pressing means are such that through-holes are provided so as to penetrate the upper plate 20 and the lower plate 22, bolts are inserted into the through-holes and tightened with nuts (tightened at plurality of places) or the upper plate 20 and the lower plate 22 are tightened with clamps.

In the above described configuration, hydrogen gas is supplied to the anode side and oxygen containing gas (air) is supplied to the cathode side, causing each unit cell to generate power. Then, the power can be extracted through the conducting wires 28 connected to the two graphite sheets 26. Since each unit cell is connected in series, the voltage of the fuel cell 10 is the sum of the voltage of each unit cell.

The components of the fuel cell according to the above embodiment of the present invention will be described in detail below.

[Electrolyte Membrane]

The electrolyte membrane in the fuel cell of the present invention is not particularly limited, and various electrolyte membranes may be adopted. As described above, the electrolyte membrane includes therein an interconnector part electrically connecting adjacent unit cells in series. The interconnector part is formed by applying heat locally to the electrolyte membrane and carbonizing as described later.

The proton conductive resin of the electrolyte membrane is preferably an aromatic polymer compound obtained by introducing sulfonic acid groups into hydrocarbon polymers such as aromatic polyarylene ether ketones and aromatic polyarylene ether sulfones. The reason for this is that the interconnector part can be formed by carbonizing an aromatic polymer compound more easily than a perfluorosulfonic acid resin such as Nation (registered trademark). Although the reason is unknown, an aromatic polymer includes a six-membered ring structure of carbon atoms in the molecular structure, and thus can be considered to be easily graphitized by pyrolysis. Such an aromatic polymer changes to a carbide having conductivity, for example, by heating at about 900° C.

[Catalyst Layer]

For example, the catalyst layer is configured including carbon particles carrying catalyst metal (catalyst particles). Examples of the carbon particles may include not only carbon black but also graphite, carbon fiber, activated carbon, etc., and pulverized products thereof, as well as carbon compounds such as carbon nanofibers and carbon nanotubes. Meanwhile, as the catalyst metal, metal such as platinum, ruthenium, iridium, rhodium, palladium, osmium, tungsten, lead, iron, chromium, cobalt, nickel, manganese, vanadium, molybdenum, gallium, and aluminum can be used alone or in combination of two or more thereof.

The catalyst layer includes not only the catalyst particles but also a proton conductive resin. The catalyst layer has a porous structure to increase the contact area with hydrogen gas and oxygen containing gas. Therefore, the filling density of the proton conductive resin is set to be less than that of the protection layer to be described later. For example, the filling density of the proton conductive resin to the catalyst layer can be 30 to 50 wt %.

Figure 3:
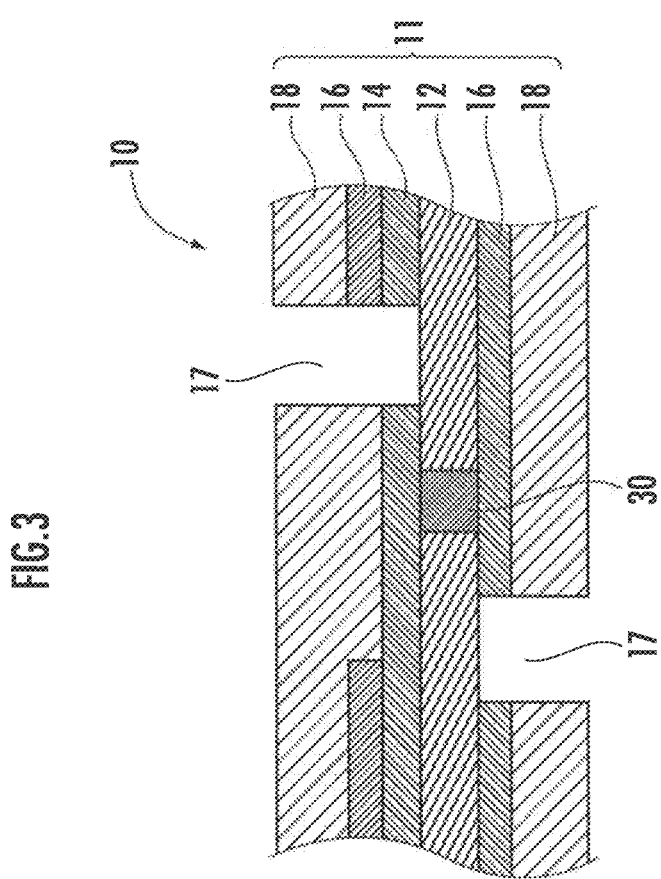
FIG. 3 is a schematic sectional view illustrating an essential part of another embodiment of the fuel cell to which the present invention is applied.

Meanwhile, when viewed in the stacking direction, the catalyst layer on the one surface preferably does not overlap the catalyst layer on the other surface of an adjacent unit cell. Such a configuration is illustrated in FIG. 3. In the fuel cell illustrated in FIG. 3, the catalyst layer 16 on the upper side (catalyst layer on the left side of the dividing groove 17 on the upper side in FIG. 3) is formed so as not to overlap the catalyst layer 16 on the lower side of an adjacent unit cell (catalyst layer on the right side of the dividing groove 17 on the lower side in FIG. 3).

In the planar array fuel cell, a region sandwiched between a dividing groove on one surface near the interconnector part and a dividing groove on the other surface (region sandwiched between the dividing groove 17 on the upper side and the dividing groove 17 on the lower side FIG. 3) is a dead area that does not contribute to net power, but such a region may cause an electrochemical reaction between catalyst and hydrogen or oxygen. However, the electrode layers on the two surfaces are short-circuited by the interconnector, and thus the generated electrical energy changes to heat. Then, excessive heat is generated in the fuel cell and the performance of the fuel cell may deteriorate. In light of this, when viewed in the stacking direction, the catalyst layer on one surface having a protection layer is made not to overlap the catalyst layer on the other surface on an adjacent unit cell. In the dead space, the catalyst layer on one surface does not overlap the catalyst layer on the other surface and thus it is difficult to react between the two catalyst layers in the dead space, and thereby heat generation can be suppressed.

As illustrated in FIG. 3, when viewed in the stacking direction, the catalyst layer on the upper side preferably does not overlap the catalyst layer on the lower side, and more preferably the dead space includes no catalyst layer on the upper side or on the lower side. This configuration can further suppress reaction that does not contribute to net power and can reduce the amount of catalyst. In addition, a protection layer is disposed also on the lower side so as to ensure the continuity between the interconnector 30 and the catalyst layer.

Table 1 shows temperature changes in the dead space after the fuel cell according to the present invention started power generation. Note that in the table, the fuel cell I represents that the catalyst layer on the upper side overlaps the catalyst layer on the lower side in the dead space; and the fuel cell II represents that the catalyst layer on the upper side does not overlap the catalyst layer on the lower side in the dead space.

TABLE 1

|  | Start time (0 seconds) | 120 seconds after start |
| --- | --- | --- |
| fuel cell I | 26° C. | 54° C. |
| fuel cell II | 26° C. | 26° C. |

It is found from the above table that the fuel cell I with the overlapped catalyst layers generated heat at the start of power generation and the temperature rose. In other words, unnecessary electrochemical reaction occurred. Assuming that the cathode side is opened like the fuel cell of the present embodiment, this generated heat may dry the electrolyte membrane and may deteriorate the power generation performance. On the contrary, it is found from the above table that in the fuel cell II without the overlapped catalyst layers, the temperature did not rise. In other words, the unnecessary electrochemical reaction was suppressed and the electrolyte membrane was suppressed from drying.

[Protection Layer]

In order to prevent so-called cross leaks representing that gas leaks in the electrolyte membrane or in the interconnector part within the electrolyte membrane or in the vicinity thereof, the protection layer is preferably disposed on one surface side of the electrolyte membrane or on the two surface sides thereof. In FIG. 1, the protection layer is disposed on the upper surface side of the electrolyte membrane 12.

The protection layer may have any properties as long as the properties can prevent cross leaks, but preferably may have gas barrier properties and may further have electrical conductivity and proton conductivity.

An embodiment of the protection layer may include proton conductive resin and conductive carbon (carbon). To enhance the gas barrier properties, the filling density of the proton conductive resin is set to be higher than that of the catalyst layer. For example, the filling density of the proton conductive resin in the protection layer may be equal to or greater than 70 wt %. Note that the proton conductive resin may be made of the same material as or a different material from the catalyst layer.

Examples of the proton conductive resin may include perfluorosulfonic acid resin such as Nafion (registered trademark) and the above described aromatic polymer compound.

Examples of the conductive carbon include carbon black, ace ene black, ketjen black and the like.

The protection layer may be formed, for example, by applying and drying a coating solution prepared by adding conductive carbon such as ketjen black to a dispersion solution of proton conductive resin such as Nafion (registered trademark). Note that the thickness of the protection layer may be, for example, 5 to 50 μm.

[Gas Diffusion Layer]

The gas diffusion layer is constituted by stacking a base material and a porous layer. The base material may include carbon paper or carbon cloth.

[Upper Plate and Lower Plate]

As described above, the upper plate 20 and the lower plate 22 include gas flow channel grooves (recessed portions) on the gas diffusion layer 18 side, and the portions (convex portions) between the flow channel grooves press the gas diffusion layers. Since the unit cells in the MEA 11 are connected in series via the interconnector part 30, the upper plate 20 and the lower plate 22 are preferably made of insulating resin. Examples of the general-purpose resin may include polypropylene resin (PP), polyphenylene sulfide resin (PPS), and the like.

As described above, the upper plate 20 and the lower plate 22 include the protruding portions 20A and 22A respectively. The protruding portions 20A and 22A are located facing each other with the interconnector part 30 therebetween in the fuel cell 10, and are configured so as to press the electrode layers on the two surfaces of the MEA 11 against the interconnector part 30.

Figure 4:
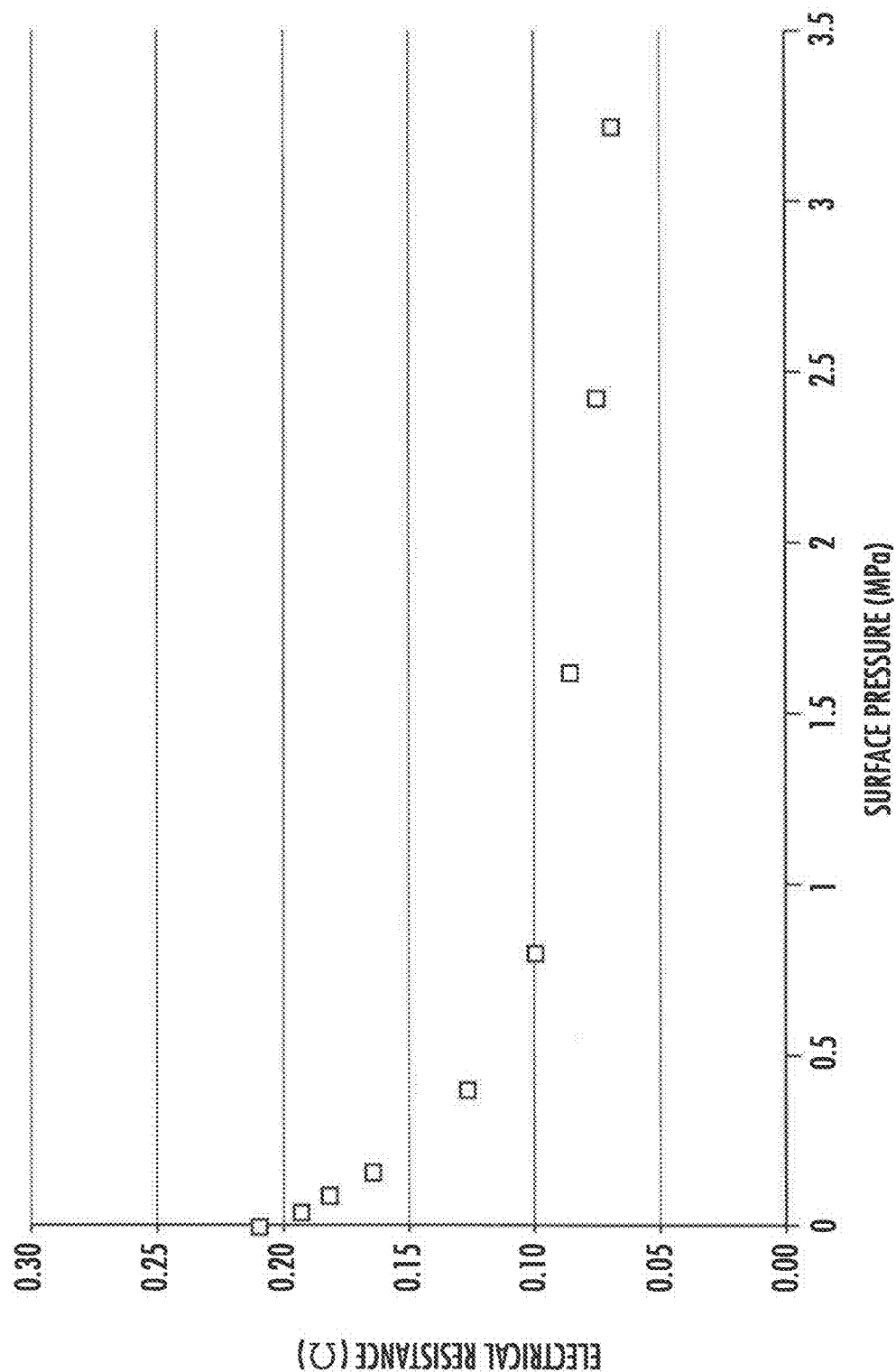
FIG. 4 is a graph illustrating electrical resistance against a pressing force to an upper plate and a lower plate.

FIG. 4 is a graph illustrating electrical resistance values between the electrodes on the two surfaces with the interconnector part 30 therebetween against the pressing force applied between the upper plate 20 and the lower plate 22 of the fuel cell according to the present embodiment. It is found from FIG. 4 that the electrical resistance is relatively high when the pressure is low and the electrical resistance is lowered when the pressure is increased. When the electrolyte membrane is made to be conductive carbide, a decrease in volume may occur. The decrease in volume may cause a recess to be formed in the relevant portion of the electrolyte membrane, and thus may reduce the contact with the electrode layer. It is considered to be for this reason that the electrical resistance is relatively high when the pressure is low. Applying the pressing force to the interconnector part by the protruding portions 20A and 22A ensures the continuity of the relevant portion and reduces the electrical resistance value.

Note that the pressure by the upper plate 20 and the lower plate 22 is preferably equal to or less than 5 MPa.

<Fuel Cell Manufacturing Method>

The fuel cell of the present invention can be manufactured by the following manufacturing method of the present invention to be described below.

First, carbon paper is prepared as the material of the gas diffusion layer 18. Then, ink containing catalyst and proton conductive resin is applied to one surface of the carbon paper to form the catalyst layer 16. Further, when the protection layer 14 is formed on the catalyst layer 16, ink containing conductive material (such as ketjen black) and proton conductive resin is applied to the catalyst layer 16 formed.

In a laminate thus formed by stacking the gas diffusion layer and the electrode layer (hereinafter referred to as a "diffusion electrode laminate"), the dividing groove 17 between the electrode regions is formed. Examples of the method of forming the dividing groove may include a method of mechanically removing the gas diffusion layer and the electrode layer of the relevant portion using a needle-shaped cutting tool and a method of irradiating the relevant portion with a laser beam and evaporating the portion.

Then, the electrolyte membrane 12 is placed on the diffusion electrode laminate having the dividing groove 17 formed therein as described above. Then, heat is applied locally to a portion to form the interconnector part 30 of the electrolyte membrane 12. Examples of the means may include laser beam irradiation. Examples of the laser light source to be used may include $CO_2$ laser.

Further, another diffusion electrode laminate is placed on a surface side opposite to the diffusion electrode laminate of the electrolyte membrane having the interconnector part 30 formed therein as described above so that the electrode layer is located on the electrolyte membrane 12 side. The other diffusion electrode laminate also has the dividing groove 17 formed before placement, and is placed by positioning so that the dividing groove 17 is placed in a predetermined position with respect to the interconnector part 30 (that is, the interconnector part is covered with the electrode region of the diffusion electrode laminate).

As described above, the diffusion electrode laminate, the electrolyte membrane, and other diffusion electrode laminate are overlapped and hot-pressed in the stacking direction for integration to manufacture the MEA 11.

As described above, the method of first stacking the catalyst layer and the protection layer and then forming the dividing groove can easily form the electrode region and thus is suitable for continuous roll-to-roll production.

Figure 8:
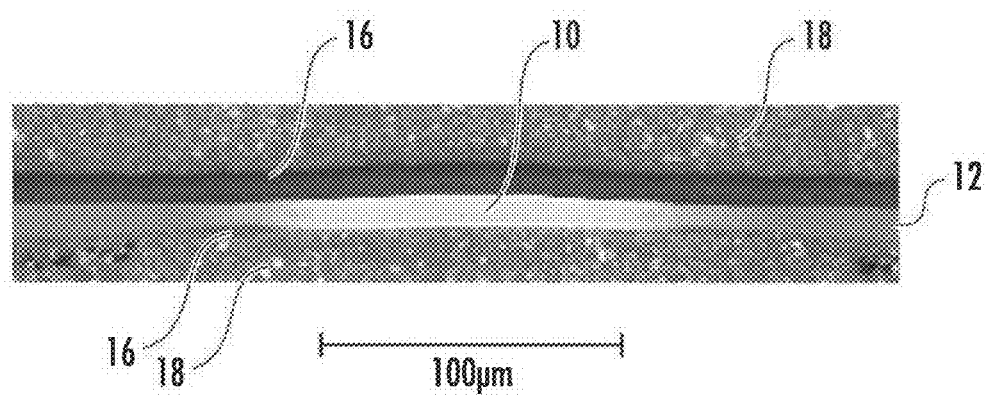
FIG. 8 is a cross-sectional photograph of an essential part of an MEA according to an embodiment.

FIG. 8 is a cross-sectional photograph of the MEA 11 (before the dividing groove 17 is formed) formed as described above. The electrolyte membrane 12 is sandwiched between the catalyst layer 16 and the protection layer 14 and catalyst layer 16, the portion in the middle portion of the electrolyte membrane turned white in the figure is the interconnector part 30.

Figure 5:
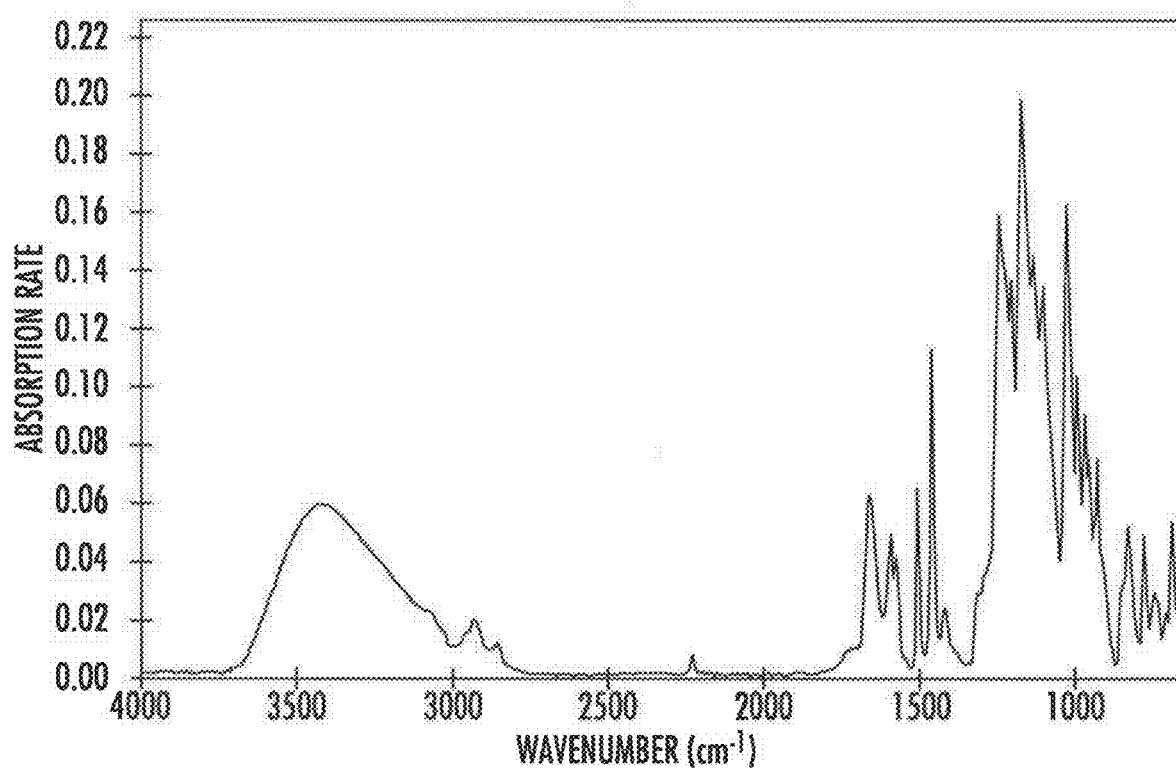
FIG. 5 is a view illustrating an FT-IR spectrum before aromatic polymers are heated.
Figure 6:
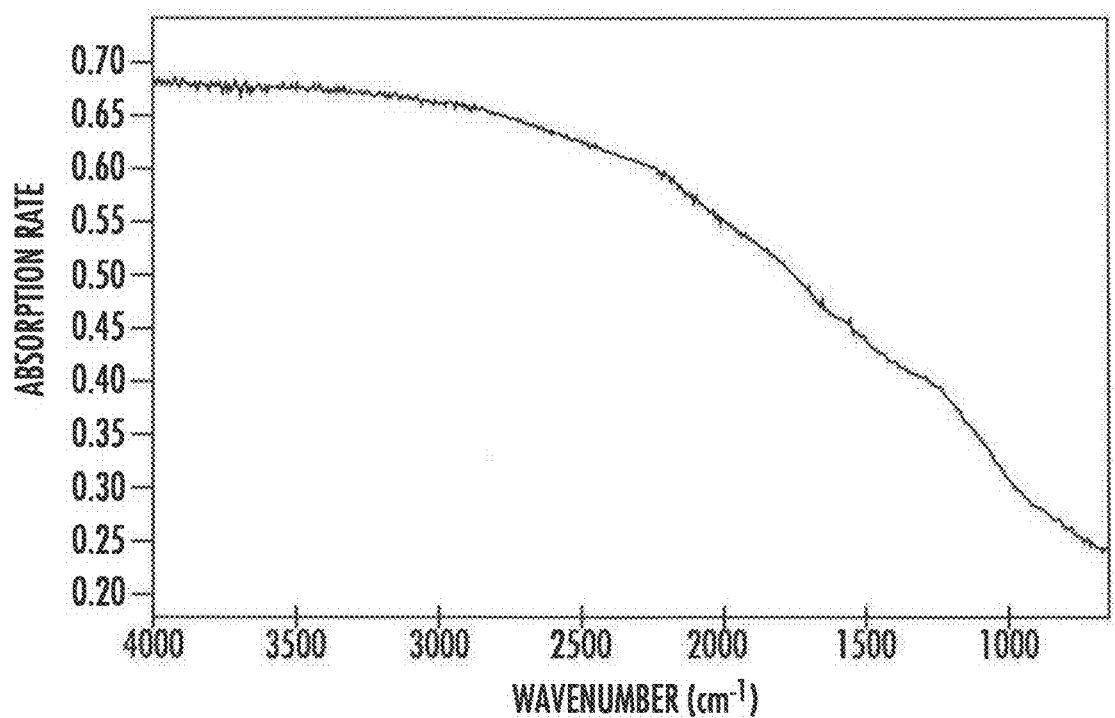
FIG. 6 is a view illustrating an FT-IR spectrum after aromatic polymers are heated.

Here, FIG. 8 illustrates the measurement results of Fourier Transform Infrared Spectroscopy (FT-IR) and Raman spectroscopy of the portion of the interconnector part before heating and after heating when an aromatic polymer is used as the proton conductive resin. FIGS. 5 and 6 illustrate the FT-IR spectrum before heating and after heating respectively. In FIG. 5 before heating, an absorption line derived from the bonding between atoms in the proton conductive resin was observed, while in FIG. 6 after heating, the absorption line disappeared. This is probably because the proton conductive resin was decomposed by heating and changed into a carbonaceous material.

Figure 7:
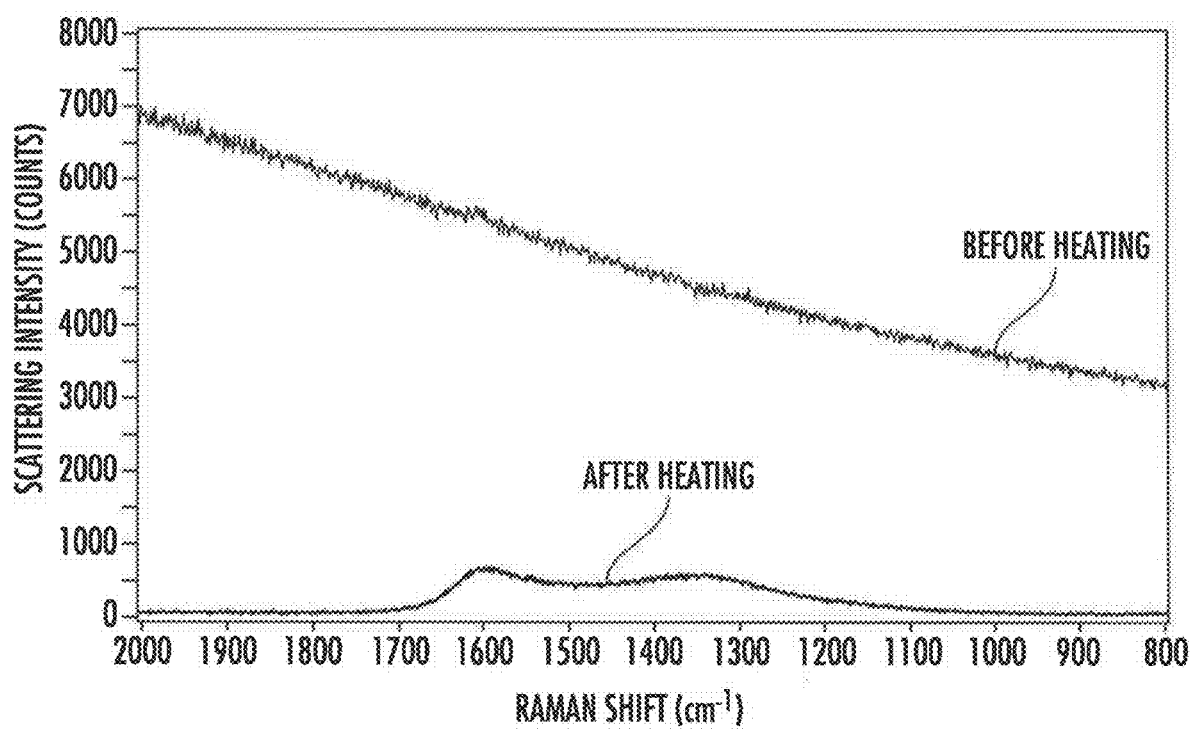
FIG. 7 is a view illustrating a Raman spectrum before and after aromatic polymers are heated.

Meanwhile, it is found from the measurement results of Raman spectroscopy that no peak appeared before heating, but peaks appeared at the vicinity of 1350 $cm^{-1}$ and 1600 $cm^{-1}$ after heating (FIG. 7). These are considered to be the D band and the G band, respectively, derived from the carbonaceous material, and it is considered that the relevant portions were changed into carbonaceous materials by the heating.

As described above, conductivity having a volume resistivity of about 0.1 Ωmm can be easily imparted to the relevant portion by carbonizing the proton conductive resin by heating.

REFERENCE SIGNS LIST 10 fuel cell
12 electrolyte membrane
14 protection layer
16 catalyst layer
17 dividing groove
18 gas diffusion layer
20 upper plate
22 lower plate
24 seal
26 graphite sheet
28 conducting wire
30 interconnector part

The invention claimed is:

1. A fuel cell comprising an electrode layer on each of two surfaces of an electrolyte membrane made of a proton conductive resin, wherein
the electrode layers on the two surfaces each include a plurality of electrode regions divided by a dividing groove; and a unit cell is constituted by a stacked structure including one electrode region on one surface side of the two surfaces, one electrode region on another surface side of the two surfaces opposing the one electrode region on the one surface side, and the electrolyte membrane; and
a plurality of the unit cells being arranged, wherein
the electrolyte membrane includes therein an interconnector part electrically connecting the electrode region on the one surface side of one of the unit cells and the electrode region on the another surface side of a unit cell arranged adjacent to the one unit cell; and
the interconnector part is made of conductive carbide derived from the proton conductive resin of the electrolyte membrane.

2. The fuel cell according to claim 1, wherein the proton conductive resin is an aromatic polymer.

3. The fuel cell according to claim 1, further comprising a pressing member pressing each of the electrode layers on the two surfaces against the interconnector part.

4. A method of manufacturing a fuel cell comprising an electrode layer on each of two surfaces of an electrolyte membrane made of a proton conductive resin, the method comprising:
forming the electrode layers on the two surfaces, with each of the electrode layers including a plurality of electrode regions divided by a dividing groove, wherein a plurality of the unit cells are arranged, each a unit cell being constituted by a stacked structure including one electrode region on one surface side of the two surfaces, one electrode region on another surface side of the two surfaces opposing the one electrode region on the one surface side, and the electrolyte membrane; and
forming an interconnector part in the electrolyte membrane by applying heat locally to the electrolyte membrane and carbonizing the proton conductive resin, the interconnector part being formed to electrically connect the electrode region on the one surface side of one of the unit cells and the electrode region on the another surface side of a unit cell arranged adjacent to the one unit cell, and the interconnector part being made of conductive carbide derived from the proton conductive resin of the electrolyte membrane.

5. The method of manufacturing the fuel cell according to claim 4, wherein, in forming the interconnector part, heat is applied to the electrolyte membrane by irradiating the electrolyte membrane with laser light.

6. The method of manufacturing the fuel cell according to claim 4, wherein the proton conductive resin is an aromatic polymer.

* * * * *